Aug. 3, 1965 J. MARVEL 3,198,861
METHOD OF FORMING A THERMOPLASTIC BOTTLE HAVING A CONVEX
REVERSIBLE CURVATURE AT THE BOTTOM
Filed Aug. 25, 1961 2 Sheets-Sheet 1

INVENTOR
JACKSON MARVEL

BY *Mason, Porter, Miller & Stewart*
ATTORNEYS

Aug. 3, 1965 J. MARVEL 3,198,861
METHOD OF FORMING A THERMOPLASTIC BOTTLE HAVING A CONVEX
REVERSIBLE CURVATURE AT THE BOTTOM
Filed Aug. 25, 1961 2 Sheets-Sheet 2
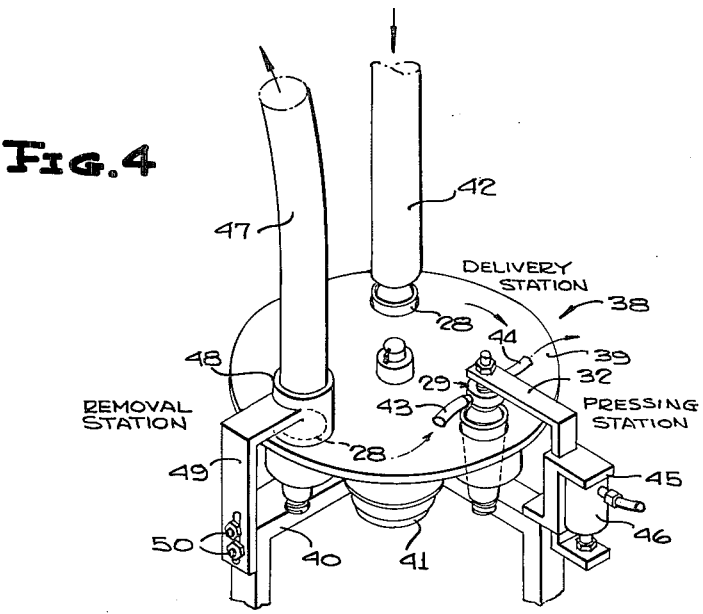
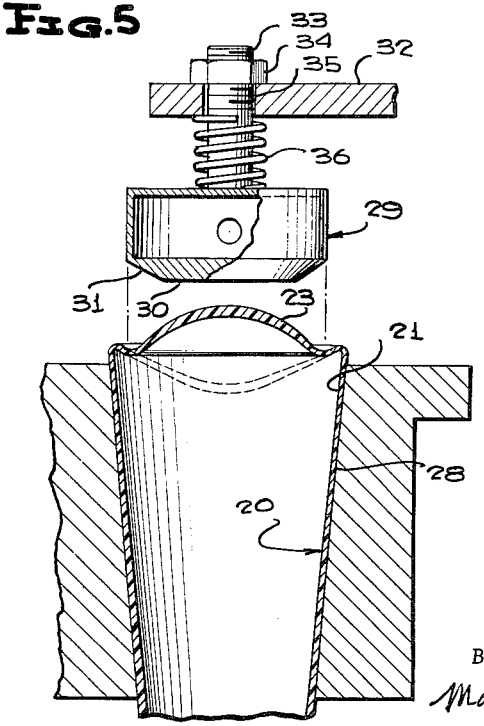
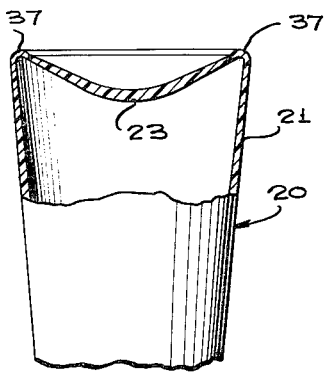
INVENTOR
JACKSON MARVEL
BY
*Mason, Porter, Diller & Stewart*
ATTORNEYS

United States Patent Office 3,198,861
Patented Aug. 3, 1965

3,198,861
METHOD OF FORMING A THERMOPLASTIC BOTTLE HAVING A CONVEX REVERSIBLE CURVATURE AT THE BOTTOM
Jackson Marvel, Wellesley, Mass., assignor to Continental Can Company, Inc., a corporation of New York
Filed Aug. 25, 1961, Ser. No. 133,826
6 Claims. (Cl. 264—98)

This invention relates in general to new and useful improvements in bottles formed of thermoplastic material, preferably of the organic polymeric type such as polyethylene or the like, and more particularly to a novel bottom construction for a bottle, and method for forming the bottom structure.

It is desired to produce a plastic bottle having a recessed concave bottom. One of the usual methods of forming bottles of thermoplastic material is to extrude a tube of the thermoplastic material with the tube passing between two separated halves of a mold. The two halves of the mold are then moved together to clamp the tube, with the mold pinching off and sealing a section of the tube, after which a needle is injected into the pinched off section of the tube and air under pressure is directed into the pinched off section of the tube to blow the tube within the mold to the configuration of the cavity of the mold. When attempts have been made to directly mold the bottom of a bottle to have a recessed concave configuration, it has developed that there is insufficient thermoplastic material available for forming the bottom part of the bottle with the result that there is an undue thinning down of the bottle at the point of juncture between the bottom and body of the bottle. As a result, such bottles have proven to be unsatisfactory.

In view of the foregoing, it is the primary object of this invention to provide a novel thermoplastic bottle which is initially formed with a convex projecting bottom and which bottom is forced upwardly into the general interior of the bottle to a depressed position with the bottom now being concavely curved.

Another object of this invention is to provide a novel method of forming a bottle having a recessed concavely curved bottom, the bottle being formed from an extruded length of thermoplastic material in the form of a tube, with a length of the tube being pinched off within a mold and sealed, after which air is directed into the length of tube to blow the tube to the configuration of the cavity of the mold, the bottle being initially formed with a convexly curved projecting bottom whereby a greater length of tube may be pinched off by the mold for blowing into the desired bottle shape, thereby making more thermoplastic material available for forming the bottom portion of the bottle, after which the projecting convexly curved bottom is pushed in under pressure while it is still sufficiently warm to be flexed so that the previously projecting convexly curved bottom assumes a recessed position within the general confines of the bottle and is concavely curved.

Still another object of this invention is to provide a novel bottle having a recessed concavely curved bottom, the bottle being formed from an extruded length of hot thermoplastic material wherein the length of the thermoplastic material which goes into the forming of the bottle is in excess of the length of the bottle, blowing the length of tube within a mold to provide a projecting convexly curved bottom type bottle with there being ample thermoplastic material available for the formation of the bottom of the bottle to preven excess thinning down of the bottom portion of the bottle, and thereafter pressing the projecting convexly curved bottom inwardly into the interior of the bottle so that it assumes a recessed, concavely curved position.

With the above and other objects in view that will hereinafter appear, the nature of the invention will be more clearly understood by reference to the following detailed description, the appended claims and the several views illustrated in the accompanying drawings.

In the drawings:

FIGURE 4 is a perspective view showing schematically an example apparatus for automatically pressing in the bottoms of bottles from the molded projecting convexly curved positions to recessed concavely curved positions.

FIGURE 5 is an enlarged fragmentary vertical sectional view through a portion of the apparatus of FIGURE 4, and shows the manner in which a bottle is supported during a bottom pressing operation, and the general details of a presser head for pressing the bottom of the bottle.

FIGURE 6 is an enlarged fragmentary elevational view of the bottom portion of a bottle formed in accordance with this invention, a part of the bottle being broken away and shown in section in order to clearly illustrate the details of the recessed concavely curved bottom.

Figure 1:
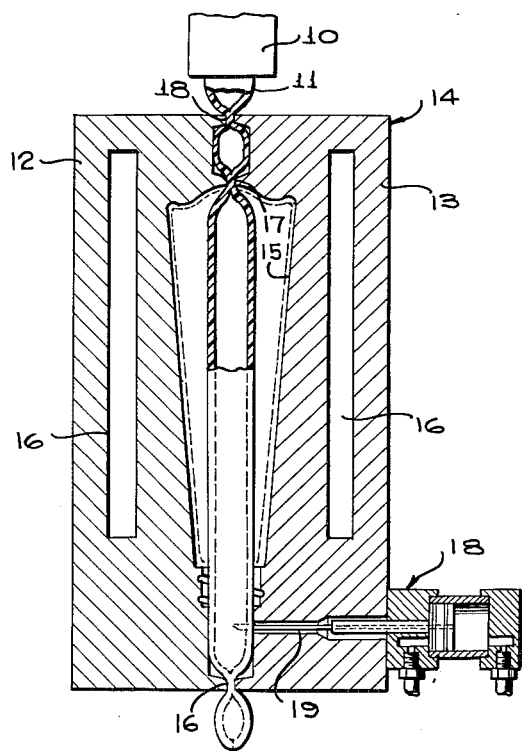
FIGURE 1 is an elevational view showing a conventional type of apparatus for forming a thermoplastic bottle from a freshly extruded tube of thermoplastic material, the mold and portions of the tube being shown in section and the mold being particularly designed to have a cavity for forming a bottle with a projecting convexly curved bottom.

Referring now to the drawings in detail, it will be seen that there is illustrated in FIGURE 1 an apparatus for forming a bottle of organic polymeric thermoplastic material, such as polyethylene or the like. This apparatus includes a conventional extrusion nozzle 10 which extrudes a tube 11 of thermoplastic material. The extruded tube 11 passes between split halves 12, 13 of a two-piece mold, generally referred to by the numeral 14. The mold 14 is of a conventional construction, with the exception of the shape of the cavity 15 thereof. The mold 14 is water cooled and is provided with water passages 16 in the mold halves 12, 13. Also, the mold halves 12, 13 cooperate to pinch off and thus seal the lower portion of the tube 11, as at 16. In addition, the mold halves 12, 13 cooperate to pinch off and thus seal an upper portion of the tube 11, as at 17. A further pinching of the tube 11 takes place at 18'.

It is to be understood that in the forming of a bottle utilizing the mold 14, a blow molding operation is followed. To this end, the mold half 13 is provided with a needle assembly, generally referred to by the numeral 18. The needle assembly 18 includes a needle 19 which is projected into the sealed off portion of the tube 11 within the mold 14 and compressed air is supplied to the interior of the sealed off portion of the tube 11 through the needle 19. The thermoplastic material of the tube 11 being still hot and soft, when compressed air enters thereinto through the needle 19, the sealed off portion of the tube 11 is blown to the configuration of the cavity 15.

Figure 2:
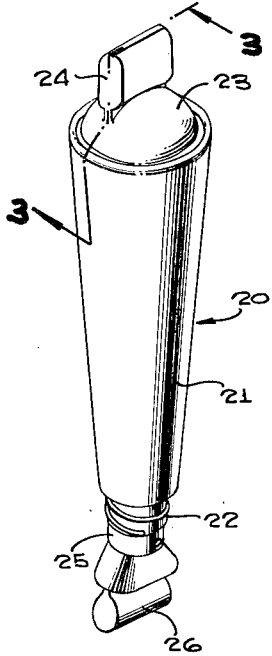
FIGURE 2 is a perspective view of a bottle immediately after the formation thereof and before the flash usually attached to the bottle has been removed therefrom.
Figure 3:
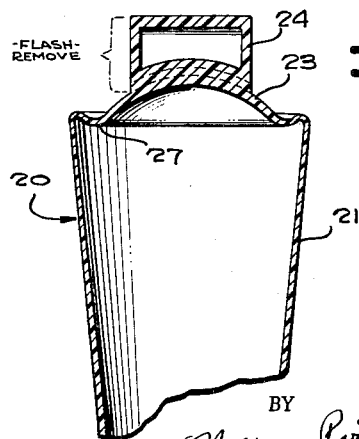
FIGURE 3 is an enlarged fragmentary vertical sectional view taken along the line 3—3 of FIGURE 2, and shows the specific details of the bottom portion of the bottle as it appears when initially molded.

Reference is now made to FIGURES 2 and 3 of the drawings wherein details of a bottle, generally referred to by the numeral 20, formed utilizing the mold 14, are illustrated. The bottle 20 includes a tapered body 21 having an upper reduced externally threaded neck 22, and a projecting convexly curved bottom 23. In the molding operation, an excess portion of the tube 11 remains connected to the bottom 23 in the form of flash 24 which is simply broken off the bottom 23. The neck 22 as an extension 25 through which the needle 19 is projected, and the extreme upper end of the bottle, which is shown in an inverted position in FIGURE 2, includes removable flash 26.

Reference is now made to FIGURE 3 in detail, wherein it will be seen that the projecting convexly curved bottom 23 is connected to the body 21 by a generally S-shaped cross-sectional peripheral annular portion 27.

It will be obvious upon considering FIGURE 1 that the length of the tube 11 from which the bottle 20 is formed is in excess of that which would be provided if the bottom 23 were to be flush or recessed. Thus, a greater amount of thermoplastic material is available for the forming of the bottom 23. Heretofore, in the forming of bottles with flat bottoms or with recessed bottoms, there has been insufficient material to obtain the desired thickness of material at the intersection of the bottom and the body of the bottle. As a result, the bottles are unduly weak at this point and oftentimes are not acceptable.

Reference is now made to FIGURE 5 in particular, wherein the bottle 20 is illustrated as being seated within a socket 28 with the projecting bottom 23 thereof in alignment with a presser head 29. The presser head 29 is of a hollow construction and is water cooled. The presser head 29 has a central flat bottom portion 30 and an outer upwardly flaring bottom portion 31. The presser head 29 is illustrated as being carried by a vertically movable support 32, the presser head 29 being secured to the support 32 by means of a bolt 33 and a nut 34, the bolt 33 passing through an opening 35 in the support 32. The nut 34 engages the upper side of the support 32 to prevent the release of the presser head 29. A coil spring 36 is carried by the bolt 33 intermediate the support 32 and the upper surface of the presser head 29 to permit limited upward movement of the presser head 29 with respect to the support 32.

At the time the bottle 20 is positioned within the socket 28, the body 21 of the bottle 20 has cooled sufficiently to be self-supporting. On the other hand, due to the mass of the thermoplastic material of the bottom 23, the bottom 23 is still soft and pliable.

When the presser head 29 is moved downwardly and engages the projecting bottom 23, and as the presser head 29 continues to move downwardly, the bottom 23 has a tendency to flatten out until it lies in a plane normal to the axis of the bottle 20, at which time, it has a tendency to snap overcenter and as a result, the bottom 23 shifts from an outwardly projecting convexly curved condition to a recessed concavely curved position, as is shown in dotted lines in FIGURE 5 and solid lines in FIGURE 6. Since the bottom 23 will automatically snap to its recessed position, it is not necessary that the underside or bottom of the presser head 29 correspond to the curved shape of the bottom 23, it only being necessary that the shape of the presser head 29 be such that it will exert the necessary pressure on the bottom 23 to effect the snapping thereof beyond a central position to the recessed position without there being any localized pressures on the bottom 23 which would distort the bottom 23.

Reference is now made to FIGURE 6 in particular wherein it will be seen that the recessed bottom 23 is no longer connected to the body 21 of the bottle 20 by a generally S-shaped cross-sectional portion, but is now connected to the bottom of the body 21 along a downwardly projecting bead 37. It is to be noted that the material in the bead 37 is of sufficient thickness to provide the necessary strength of the bottle 21.

Reference is now made to FIGURE 4, wherein there is illustrated diagrammatically an apparatus for automatically pressing the bottoms of bottles in accordance with this invention, the apparatus utilizing the presser head 29. The apparatus of FIGURE 4 is generally referred to by the numeral 38 and includes an indexible turret 39 which is carried by a suitable frame structure 40 and which includes a drive mechanism 41. The turret 39 is provided with a plurality of openings or sockets 28 for the reception of the bottles 20. As the turret 39 is indexed, the sockets, in sequence, move into alignment with a bottle delivery tube 42 which will supply a bottle to each one of the sockets 28 as the turret 39 rotates.

In the use of the apparatus 38, the turret 39 is indexed in a clockwise direction and a bottle is moved to a pressing station wherein the presser head 29 is utilized. The presser head 29 has connected thereto a coolant supply line 43 and a coolant discharge line 44 to assure the proper cooling of the presser head 29.

A bracket 45 is carried by the frame 40 and supports a suitable power unit 46 which, in turn, is connected to the support 32 in any desired manner whereby the support 32 is vertically reciprocated. The reciprocation of the support 32 is in timed relation to the indexing of the turret 39 and the presser head 29 is reciprocated for the purpose of pressing in the previously projecting bottom of the bottle.

After the bottom of the bottle 20 has been pressed in to the position illustrated in FIGURE 6, the turret 39 again indexes to align the socket 28 to pass from the pressing station and into alignment with a discharge tube 47. The lower end of the discharge tube 47 is held in place by means of a collar 48 which, in turn, is carried by an angle bracket 49 adjustably secured to the frame 40 by means of fasteners 50. The tube 47 may be in the form of a vacuum tube to effect the easy removal of the bottle 20 from the turret 39.

At this time, it is pointed out that the support 32 may be reciprocated by any desirable cam type drive or any other suitable means may be provided for reciprocating the support 32 to raise and lower the presser head 29.

Although there has been indicated that the thermoplastic material used in the formation of the bottles in accordance with this invention is preferably of the organic polymeric type, such as polyethylene, it is to be understood that the invention is not restricted to polyethylene but will apply equally as well to other suitable thermoplastic materials.

From the foregoing, it will be seen that novel and advantageous provision has been made for carrying out the desired end. However, attention is again directed to the fact that variations may be made in the example bottle, method and apparatus disclosed herein without departing from the spirit and scope of the invention, as defined in the appended claims.

I claim:

1. A method of forming a bottle having a concavely curved recessed bottom comprising the steps of forming a bottle having a projecting convexly curved bottom, and then pressing in the bottom whereby the curvature of the bottom is reversed and the bottom becomes permanently recessed and concavely curved.

2. The method of claim 1 wherein the bottle is formed from hot moldable material and the pressing of said bottom takes place while the material of the bottom is still hot and moldable.

3. A method of forming a bottle having a concavely curved recessed bottom comprising the steps of extruding a heated tube of thermoplastic material and passing the same into a mold, pinching off a predetermined length of the tube within the mold, injecting air under pressure into the length of tube and expanding the tube to conform to the internal outline of the mold and to form a bottle having a projecting convexly curved bottom, and then pressing in the bottom whereby the curvature of the bottom is reversed and the bottom becomes recessed and concavely curved.

4. The method of claim 3 wherein the pressing of said bottom takes place while the material of the bottom is still hot and moldable.

5. A method of forming a bottle having a concavely curved recessed bottom comprising the steps of extruding a heated tube of thermoplastic material and passing the same into a mold, pinching off a predetermined length of the tube within the mold; injecting air under pressure into the length of tube and expanding the tube to conform to the internal outline of the mold and to form a bottle having a body, a projection convexly curved bottom and a generally S-shaped cross sectional annular connecting portion; and then pressing in the bottom whereby the curvature of the bottom is reversed and the bottom becomes recessed and concavely curved with the bottom being joined to the body by a depending peripheral bead.

6. The method of claim 5 wherein the pressing of said bottom takes place while the material of the bottom is still hot and moldable.

References Cited by the Examiner

UNITED STATES PATENTS

| | | | |
|---|---|---|---|
| 2,288,454 | 6/42 | Hobson | 18—55 |
| 2,562,523 | 7/51 | Brunet | 18—55 |
| 2,695,423 | 11/54 | Pardee et al. | 18—19 |
| 2,836,318 | 5/58 | Pinsky et al. | 215—1.5 |
| 2,854,694 | 10/58 | Mumford | 18—19 |
| 2,860,801 | 11/58 | Nielsen | 215—1.5 |
| 2,890,483 | 6/59 | Soubier | 18—5 |
| 2,953,817 | 9/60 | Miller et al. | 18—55 |
| 3,009,198 | 11/61 | Kalman et al. | 18—5 |
| 3,050,773 | 8/62 | Hagen | 18—55 |

FOREIGN PATENTS

| | | |
|---|---|---|
| 220,099 | 2/59 | Australia. |
| 1,208,633 | 2/60 | France. |

ROBERT F. WHITE, *Primary Examiner.*

WILLIAM J. STEPHENSON, MICHAEL V. BRINDISI,
*Examiners.*